United States Patent

Fulcher et al.

[19]

[11] Patent Number: 6,032,497

[45] Date of Patent: Mar. 7, 2000

[54] VEHICLE IMMOBILIZER WITH SELF-POSITIONING TIRE SHOP

[75] Inventors: Robert A. Fulcher; Allan E. Beavers, both of Grand Junction, Colo.

[73] Assignee: MITI Manufacturing Co., Inc., Grand Junction, Colo.

[21] Appl. No.: 09/240,757

[22] Filed: Jan. 29, 1999

Related U.S. Application Data

[60] Provisional application No. 60/086,407, May 22, 1998.

[51] Int. Cl.[7] .................................................. B60R 25/00
[52] U.S. Cl. ................................. 70/19; 70/226; 70/237
[58] Field of Search .............................. 70/19, 237, 225, 70/226, 14, 18, 259, 260; 188/32

[56] References Cited

U.S. PATENT DOCUMENTS

| | | | |
|---|---|---|---|
| Re. 24,712 | 10/1959 | Marugg | 70/225 |
| 1,293,109 | 2/1919 | Kaplan | 70/19 |
| 2,844,954 | 7/1958 | Marugg | 70/225 |
| 2,960,857 | 11/1960 | Winter | 70/19 |
| 3,695,071 | 10/1972 | West | 70/225 |
| 3,828,590 | 8/1974 | Thiebault | 70/70 |
| 3,868,837 | 3/1975 | Quimby | 70/18 X |
| 4,723,426 | 2/1988 | Beaudoin | 70/70 |
| 4,819,462 | 4/1989 | Apsell | 70/226 X |
| 4,833,442 | 5/1989 | Von Heck | 70/226 X |
| 5,040,389 | 8/1991 | Beaudoin | 70/226 |
| 5,375,442 | 12/1994 | Hammer | 70/226 |
| 5,385,038 | 1/1995 | Walker | 70/226 X |
| 5,865,048 | 2/1999 | Beavers et al. | 70/70 |

FOREIGN PATENT DOCUMENTS

| | | | |
|---|---|---|---|
| 2279590 | 2/1976 | France | 70/14 |
| 2520683 | 8/1983 | France | 70/226 |
| 8403751 | 7/1986 | Netherlands | 70/237 |

*Primary Examiner*—Lloyd A. Gall
*Attorney, Agent, or Firm*—Sheridan Ross P.C.

[57] ABSTRACT

A vehicle immobilizing device adapted for removable interconnection to a vehicle wheel assembly for temporarily immobilizing the vehicle. The vehicle immobilizing device utilizes an outer arm, an inner arm, an engagement dome, a self-positioning tire stop, and a securing mechanism which in combination provides engagement to the vehicle wheel assembly to prevent unauthorized removal.

23 Claims, 3 Drawing Sheets

VEHICLE IMMOBILIZER WITH SELF-POSITIONING TIRE SHOP

This application claims priority of pending provisional patent application Serial No. 60/086,407, having a filing date of May 22, 1998, and being incorporated herein by reference in its entirety.

FIELD OF THE INVENTION

The present invention relates to a device and method for temporarily immobilizing wheeled vehicles to inhibit theft or the unauthorized movement of those vehicles.

BACKGROUND OF THE INVENTION

The use of vehicle immobilizers to prevent the unauthorized movement of automobiles and other wheeled vehicles has been known for some time. The original rudimentary devices were designed for the same basic purpose as those today. That is, to prevent theft and to assure the payment of parking fines prior to movement of the vehicle. Thus, the use of vehicle immobilizers has become widespread with law enforcement, parking attendants, city governments and individuals concerned with the theft of their vehicles, wheeled trailers and even aircrafts.

Unfortunately, the vehicle immobilizing devices currently known in the art are difficult to install, can damage the vehicle, are prone to being removed by unauthorized personnel and are not versatile for use on a variety of vehicles and wheel assemblies.

One problem associated with many vehicle immobilizer designs is the ease upon which they can be removed by irate vehicle owners and thieves. This is a result of inadequate points of engagement or contact between the immobilizing device and the vehicle wheel assembly. As used herein, the term "vehicle wheel assembly" is defined as a vehicle wheel and hubcap, an interconnected tire, brake assembly and in some vehicle designs tie rods which are used for support and/or steering purposes. The brake assembly may include a drum or disk brake with or without a brake backing plate. Thus, without adequate points of contact, the vehicle immobilizer can be pried and pulled off. This often occurs in conjunction with letting the air out of the tire until the device can be removed from the wheel assembly. For example, U.S. Pat. No. 24,712 to Marugg and U.S. Pat. No. 2,960,857 to Winter both utilize only 3 points of engagement on the vehicle wheel assembly. These points of contact include the outer hubcap, the outer wheel surface and the inner wheel surface.

Another problem associated with many types of vehicle immobilizers is the difficulty associated with installation and removal. This is due to their generally heavy weight and inner and outer arm assemblies which must be precisely positioned on the inner and outer wheel rims with very limited space. Thus, proper installation is time consuming and often performed improperly by unskilled installers, resulting in damage to the vehicle wheel assembly or unauthorized removal.

Yet another problem associated with many types of vehicle immobilizers is the permanent damage caused to the vehicle inner wheel, outer wheel, wheel rims, hubcaps and/or braking mechanisms. The damage to the hubcap and or outer wheel rim is the result of significant force and abrasion from a rigid metallic plate or arm assembly which is pressed against the hubcap or outer wheel. Any prying or movement of the dome will permanently scratch and/or dent the hubcap or outer wheel causing considerable damage.

The outer and inner wheel rims may also be damaged with many types of vehicle immobilizing devices as a result of the rigid, non-moving rim jaws which are engaged to the inner or outer rim, as shown in U.S. Pat. No. 2,960,857 to Winter. Any prying of the vehicle immobilizer may result in the rims becoming bent or disfigured resulting in expensive repair or replacement costs. Further, since the rim jaws are not capable of moving longitudinally and/or in a vertical direction with respect to the outer arm of the vehicle immobilizer, the vehicle immobilizer cannot be properly fitted to numerous types and sizes of wheel assembly. As a result, there is often an improper installation which permits the removal of the vehicle immobilizer and/or damage to the vehicle wheel assembly.

Finally, an additional problem associated with many vehicle immobilizing devices is a lack of versatility for use on a variety of models of wheel assemblies and automobiles. Thus, even for a certain size or model of vehicle many vehicle immobilizers cannot be used interchangeably on both the right side and left side of a vehicle. Thus, installers must have numerous models in stock for a variety of vehicles rather than utilize a versatile, universal model capable of use on a variety of vehicles and wheel assemblies.

SUMMARY OF THE INVENTION

It is therefore an object of the present invention to provide a lightweight, versatile vehicle immobilizing device which is adapted for attachment to a wheeled vehicle to inhibit theft and the unauthorized removal of the vehicle. The device preferably engages the wheel assembly of a vehicle at a minimum of four distinct locations to provide sufficient securement.

Accordingly, in one aspect of the present invention a vehicle immobilizing device is provided for removable attachment to a vehicle wheel assembly. The wheel assembly generally comprises a wheel, an interior and exterior wheel surface, a tire interconnected thereto, a hubcap, a braking mechanism, and/or a tie-rod assembly.

The immobilizing device generally comprises an outer arm and an inner arm interconnected to a base assembly which encloses a securement means for securing the immobilizing device to the vehicle wheel assembly. More specifically, the outer arm is interconnected on a first end to the base assembly and on a second end to an engagement dome which is positioned for engagement to the exterior wheel surface.

The outer arm additionally has a self-positioning tire stop interconnected to an interior surface of the outer arm to engage an outer surface of the wheel rim and/or the exterior surface of the vehicle tire. The self-positioning tire stop is biased inwardly toward the vehicle wheel assembly to provide constant tension against the wheel rim and/or tire.

Additionally, the self-positioning tire stop is interconnected to the inner arm in a manner which allows a lateral and vertical flexing motion that reduces installation time and provides a secure point of interconnection between the self-positioning tire stop and the wheel rim and/or tire. The point of engagement between the self-positioning tire stop and wheel rim and/or tire is critical to a proper installation of the vehicle immobilizer to prevent the unauthorized removal and/or damage to the vehicle wheel rim or tire. With the present invention, when force is applied to the vehicle immobilizer, the self-positioning tire stop deflects, thus driving a corner portion of the self-positioning tire stop into the tire or wheel rim, thus making it substantially impossible to disengage without the proper removal tools.

In a preferred embodiment of the present invention the self-positioning tire stop has an "H" shaped engagement member to provide 4 distinct corners for engaging a portion of the vehicle wheel rim and/or tire. In use, at least one and possibly four corners of the "H" shaped engagement member will be in contact with the vehicle wheel rim and/or tire. In an alternative embodiment of the present invention the self-positioning tire stop may be shaped like one or more inverted "V"s to provide a single, more abrupt point of contact. This embodiment is designed primarily for use with solid rubber tires which are not capable of being punctured by the self-positioning tire stop when extreme force is applied.

In another embodiment of the present invention the outer arm comprises an interconnected tire stop length adjustment assembly which operates in conjunction with a plurality of apertures positioned along the longitudinal axis of the outer arm. The tire stop adjustment assembly permits the self-positioning tire stop to be moved along the longitudinal axis of the outer arm, thus allowing the user to adjust the position of the self-positioning tire stop. This feature allows the installer of the vehicle immobilizer to position the self-positioning tire stop either entirely on the vehicle wheel rim, entirely on the vehicle tire, or partially on the vehicle wheel rim and partially on the vehicle tire, depending on the application.

To adjust the position of the self-positioning tire stop, in one embodiment a bolt assembly is utilized which engages one of the outer arm apertures. The bolt is biased in a direction towards the outer arm by a leaf spring or other similar biasing mechanism. Thus, to move the adjustment assembly the self-positioning tire stop is pulled in a direction toward the inner arm, which disengages the bolt from an aperture and permits the adjustment assembly to slide along the outer arm to a new position of use.

Additionally, in a preferred embodiment utilized to provide enhanced strength to the outer arm, a strengthening bar may be interconnected to the interior surface of the outer arm to substantially prevent torsional bending or deflection of the outer arm.

The inner arm has a first end hingedly interconnected to the base and a second end operatively shaped to fit between the brake assembly and the wheel assembly to frictionally engage an inner portion of the wheel. In a preferred embodiment, the inner arm may have an interconnected plate or other interconnected member with an inner arm aperture sized to receive a secondary locking mechanism such as a chain or padlock. In this embodiment the chain may be wrapped around the vehicle wheel assembly and axle and locked to the inner arm aperture to further prevent removal of the vehicle immobilizer.

Additionally, a stopping member is interconnected proximate to the second end of the inner arm which engages either a portion of the brake assembly, e.g., a brake drum or brake backing plate, or the vehicle tie rods. As the stopping member engages the brake assembly or tie rods, the second end of the inner arm is driven inward to frictionally engage the inner wheel rim. Thus, the vehicle immobilizer is in contact with the vehicle wheel assembly at four distinct locations which substantially prevents the device from being removed without a custom wrench used by the installer.

The securement assembly is interconnected to the base and preferably comprises a threaded bolt which is received by a threaded aperture. One end of the threaded bolt is in contact with a first end of the inner arm while an opposite end of the bolt is machined to receive a securement tool such as custom fitted wrench. When the bolt is turned for securing the immobilizing device to a vehicle wheel assembly, the first end of the inner arm is forced outwardly from the base in a direction opposite the outer arm. This movement drives the engagement dome into the outer wheel as the outer arm pivots on the self-positioning tire stop which is in contact with an outer surface of the vehicle tire. Simultaneously, the second end of the inner arm is forced between the brake assembly and inner wheel, while the stopping member engages the brake assembly or tie rod.

In a preferred embodiment of the present invention the inner arm has a curved shape to fit around an inflated tire and the second end of the inner arm has an arcuate cross-sectional shape. This geometric configuration permits frictional engagement to the inner surface of the wheel and thus increased difficulty in unauthorized removal. Additionally, the arcuate cross-sectional shape of the second end of the inner arm helps guide or "index" the second end of the inner arm between the brake assembly and inner wheel rim during installation.

In another embodiment of the present invention the engagement dome is preferably concentric in shape with a recessed interior portion which is sized to accept a portion of an outer wheel assembly while a perimeter edge of the engagement dome is in contact with an outer perimeter of the wheel or hubcap. This configuration allows the engagement dome to fit securely to the perimeter of the outer wheel surface or hubcap without causing damage to the vehicle wheel. Additionally, a non-metallic material such as rubber or plastic may be interconnected to the perimeter of the engagement dome to further inhibit scratching or other damage during the installation and removal of the vehicle immobilizer device.

DETAILED DESCRIPTION OF THE INVENTION

The present invention will be described with regard to the accompanying drawings which assist in illustrating various features of the invention.

In one aspect of the present invention, a vehicle immobilizer 2 is provided which is adapted for use in combination with a vehicle wheel assembly 72. For reference purposes herein, the vehicle wheel assembly 72 comprises a wheel having an inner and outer surface, a hubcap, a brake assembly, a tire interconnected to said wheel, and a tie rod assembly. The tie rod assembly and hubcap may or may not be engaged by the vehicle immobilizer depending on the vehicle model.

The vehicle immobilizer 2 generally comprises an outer arm 4 having a first end 16, and a second end 18. The outer arm 4 can also include an adjustment apparatus for modifying the total length of the outer arm 4. A self-positioning tire stop 14 is interconnected to the outer arm 4 and extends inwardly in the direction of the inner arm 6 for frictional engagement to an outer surface of the vehicle tire 54 and wheel rim 78. A wheel engagement dome 10 having a leading perimeter edge 12 is interconnected on the second end 18 of the outer arm 4 for engaging the vehicle wheel assembly 72. Preferably, the vehicle immobilizer inner arm 6, outer arm 4 and base 8 are generally constructed of a heavy duty steel which is resistant to bending, cutting or deformation to inhibit removal by non-authorized personnel. However, as appreciated by one skilled in the art, many other materials having the same physical characteristics described above could be used.

The outer arm 4 can be interconnected to an outer arm strengthening bar 76 to provide additional resistance against possible damage during any attempted forced removal of the vehicle immobilizer. The outer arm strengthening bar 76 substantially increases the strength of the outer arm 4 against torsional bending or deflection of the outer arm 4.

An inner arm 6 is provided which has a first end 24 and a second end 26. The second end 26 is operatively shaped to fit between the brake assembly (not shown) and an inner surface of the wheel assembly 72, wherein at least a portion of the second end 26 of the inner arm 6 frictionally engages an inner surface of the wheel. The inner arm 6 further includes a stopping member 66 interconnected proximate to the second end 26 of the inner arm and which extends outwardly to engage a brake assembly and/or vehicle tie rods during use.

The vehicle immobilizer 2 additionally includes a base 8 which is rigidly interconnected to the first end 16 of the outer arm 4 and pivotally interconnected to the first end 24 of the inner arm 6, wherein the inner arm 6 can pivot in a direction both inwardly and outwardly from the outer arm 4.

Furthermore, the vehicle immobilizer 2 includes a securing mechanism which is interconnected to the base 8 to provide a force to the first end 24 of the inner arm 6. This force drives the first end 24 of the inner arm 6 outwardly front the base 8, wherein the engagement dome leading perimeter edge 12 frictionally engages the wheel assembly 72, the self-positioning tire stop 14 engages the vehicle tire, the stopping member 66 engages the brake assembly (not shown), and the second end 26 of the inner arm 6 engages the wheel inner surface.

Figures 1, 2:
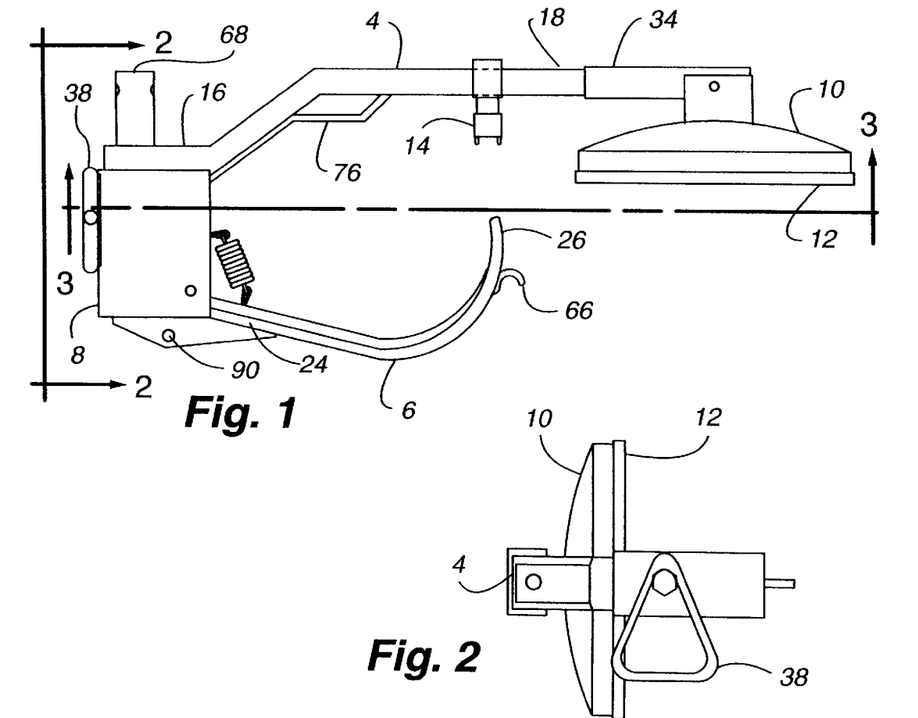
FIG. 1 is a plan top view of a vehicle immobilizer device.
FIG. 2 is an end view of the vehicle immobilizer as shown from line 2—2 of FIG. 1.
Figure 3:
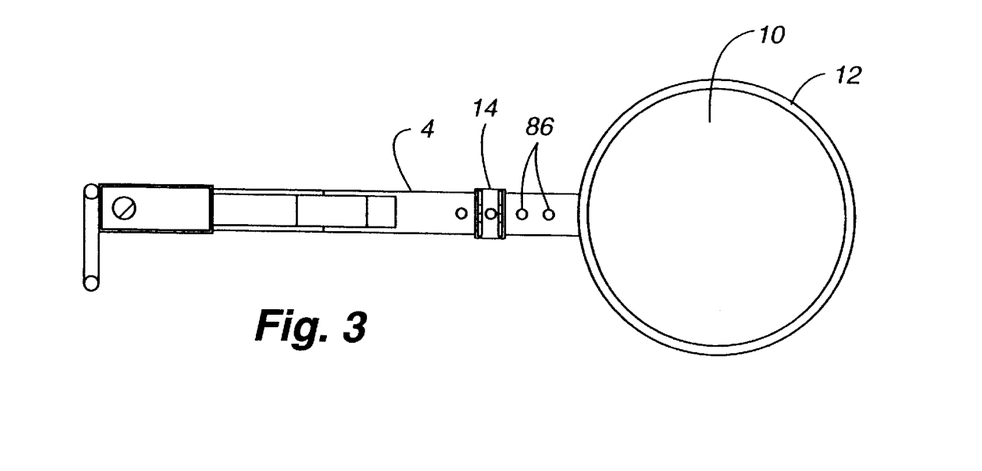
FIG. 3 is a cross-section right elevation view of line 3—3 of FIG. 1.

As identified in FIG. 1, the vehicle immobilizer 2 is generally comprised of an inner arm 6 and an outer arm 4 interconnected on a first end to a base 8. The outer arm second end 18 is interconnected to a wheel engagement dome 10 which during use is secured against the wheel assembly exterior surface and/or a vehicle hubcap. Preferably, the outer arm inner surface has a self-positioning tire stop 14 extending inwardly towards the inner arm 6 for the purpose of engaging the vehicle tire 54 and/or wheel rim 78 and to act as a pivot point for the outer arm 4 as the vehicle immobilizer 2 is secured to the vehicle wheel assembly 72.

As shown in FIGS. 6–9, the self-positioning tire stop 14 comprises an engagement member 80 which is biased to extend inwardly toward the inner arm 6, and a tire stop stud 82. In a preferred embodiment the engagement member 80 is "H"-shaped. Alternatively, and more specifically for use with solid rubber tires which are not capable of being punctured by the self-positioning tire stop 14, the engagement member 80 can be shaped like one or more inverted "V"s to provide a single, more abrupt point of contact.

The engagement member 80 is biased by a spring 92, which is coaxial to a tire stop bolt 94, or other common biasing device positioned within a tire stop stud 82 and which is generally inaccessible to prevent tampering. In one embodiment the tire stop stud 82 can be welded to the outer arm inner surface to provide securement and prevent unauthorized removal. Preferably, however, the tire stop stud 82 is interconnected to the outer arm 4 by a positioning means. The positioning means allows the tire stop stud 82 to be positioned at a desired portion along the longitudinal axis of the outer arm 4. The positioning means may include a pin and slot mechanism, bolt and screw mechanism, or other similar devices commonly known in the art. In one embodiment, the outer arm 4 and the self-positioning tire stop 14 are interconnected by a plurality of outer arm apertures 86 positioned along the longitudinal axis of the outer arm 4. The self-positioning tire stop 14 contains a tire stop position adjustment assembly 84 which engages the outer arm aperture 86. The tire stop position adjustment assembly 84 is biased in a direction towards the outer arm by a leaf spring 88 or other similar device. In this manner, the self-positioning tire stop 14 can be moved along the outer arm 4 and positioned to engage the self-positioning tire stop 14 on the vehicle wheel rim 78 and/or the vehicle tire 54. The position of the self-positioning tire stop 14 on the outer arm 4 can be adjusted by pulling the self-positioning tire stop 14 in a direction toward the inner arm 6 to disengage the tire stop position adjustment assembly 84 from an outer arm aperture 86 and sliding the self-positioning tire stop 14 to a new position of use. This flexibility allows the vehicle immobilizer to be used on a variety of different types of vehicles as well as allow the self positioning tire stop 14 to be positioned selectively either solely on the vehicle tire 54, vehicle rim 78 or both.

Figures 6, 8, 9:
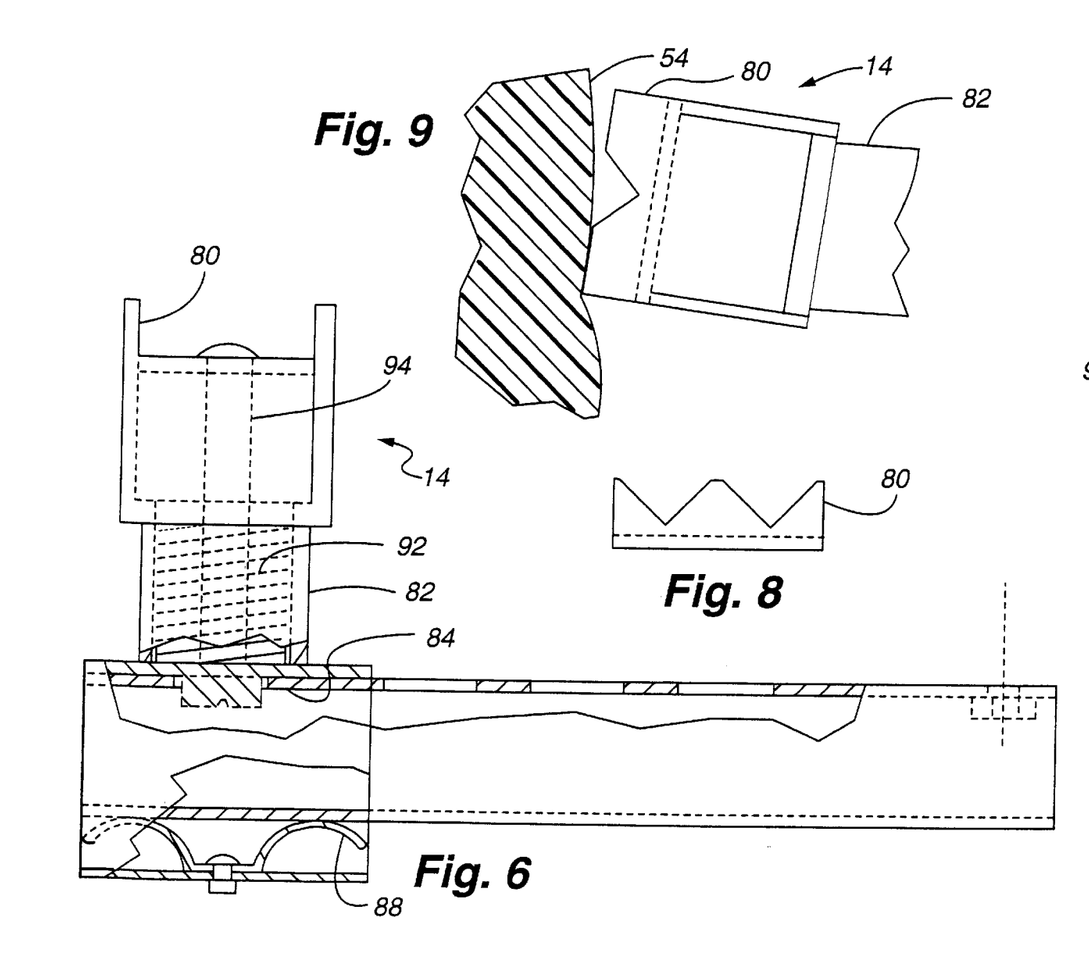
FIG. 6 is a cut-away close-up view of the self-positioning tire stop and inner components and the outer arm.
FIG. 8 is an alternative embodiment of the self-positioning tire stop having a crown-shaped engagement member.
FIG. 9 is an illustration showing a deflection of the self-positioning tire stop when a downward force is applied to the outer arm.
Figure 7:
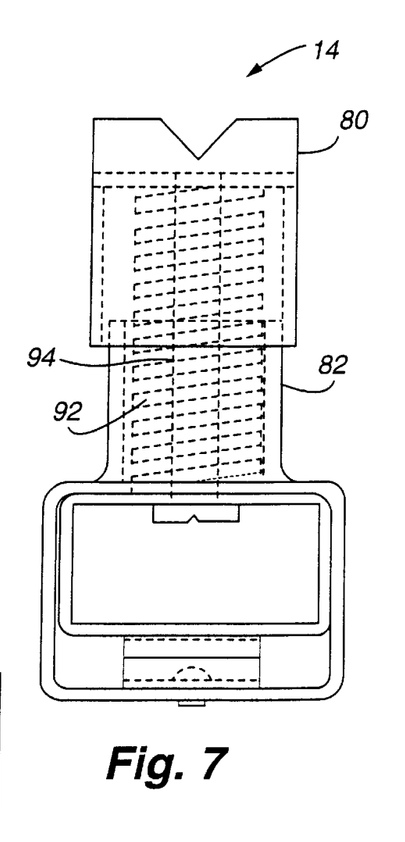
FIG. 7 is a detailed cut-away end view of the self-positioning tire stop.

Preferably, the engagement member 80 is interconnected to the tire stop stud 82 in a manner which permits movement in at least 2 different directions, and preferably 6 directions. This movement is accomplished by interconnecting the engagement member 80 to the tire stop stud 82 with a ball-type joint or by providing sufficient clearance between the two components to provide sufficient lateral deflection. By providing lateral deflection in numerous directions, as well as the outward biasings with a spring mechanism, the self-positioning tire stop 14 can engage the wheel rim 78 and/or tire 54 in such a manner to substantially prevent unauthorized removal. Thus, when downward or upward pressure is applied to the outer arm 4 in an attempt to remove the vehicle immobilizer, a corner of the engagement member 80 engages into the tire 54 and/or the rim 78, as shown in FIG. 9, thus substantially preventing removal. Furthermore, the outward biasing and deflection of the self positioning tire stop 14 prevents the unauthorized removal of the vehicle immobilizer even if the tire 54 is deflated.

The vehicle immobilizer inner arm 6 is generally comprised of an inner arm first end 24 and an inner arm second end 26. Preferably, the inner arm second end 26 has an arcuate geometric shape to permit the inner arm 6 second end 26 to fit around an inflated tire and to facilitate installation. The inner arm first end 24 is pivotally interconnected to the base 8 to permit the inner arm 6 to rotate inwardly and outwardly from the outer arm 4. This rotation eases the installation and removal of the vehicle immobilizer 2 from the vehicle wheel assembly 72, and permits the inner arm second end 26 to be driven against the wheel inner surface as force is applied to the inner arm first end 24.

As further identified in FIG. 1, the inner arm second end 26 can have an interconnected stopping member 66 positioned to extend outwardly from the inner arm outer surface. The stopping member 66 is generally "U"-shaped to provide engagement to a vehicle brake backing plate (not shown) or vehicle tie rods (not shown), although a "V"-shape or other similar configuration could be used.

The base 8 is generally comprised of a rectangular shaped enclosure which is rigidly interconnected on one end to the first end 16 of the outer arm 4 and pivotally interconnected to the inner arm first end 24 on the other end. The base 8 further comprises an enclosed securement means which permits the vehicle immobilizer 2 to be removably secured to the vehicle wheel assembly 72. More specifically, the base securement means includes a wrench entry aperture 68 which permits a custom installation tool such as a wrench to be inserted into the base 8 to engage a threaded bolt 40.

In an alternative embodiment of the present invention, a secondary locking mechanism such as a chain may be utilized to help prevent the unauthorized removal of the vehicle immobilizer 2. In one embodiment, an inner arm aperture 90 is positioned on the inner arm first end 24 proximate to the base 8 or alternately on a plate or other support piece interconnected to the inner arm first end 24 such as seen in FIG. 1. The inner arm aperture 90 is sized to receive the pin of a padlock or other device which is interconnected to a chain or cable which wraps around the vehicle wheel assembly 72 to further deter the unauthorized removal of the vehicle immobilizer 2.

To tighten the vehicle immobilizer 2 to the vehicle wheel assembly 72, the threaded bolt 40 is rotated with the wrench which drives the threaded bolt 40 into the inner arm first end 24. This force drives the inner arm first end 24 away from the base 8 in a direction substantially opposite from the outer arm 4, thus creating a rotational movement of the outer arm 4 about the self-positioning tire stop 14 which is engaged against the vehicle tire 54 and/or the rim 78. Simultaneously, as the inner arm first end 24 is driven outwardly from the outer arm first end 16, the inner arm second end 26 rotates inwardly towards the vehicle wheel assembly 72 and becomes engaged between the vehicle brake backing plate and the wheel inner surface. Simultaneously, the engagement dome 10 is driven against the vehicle wheel exterior surface to frictionally engage the vehicle wheel exterior surface.

In a preferred embodiment of the present invention a locking device is provided which prevents entry of any type of tool into the wrench entry aperture 68 and thus tampering (not shown). This may be a sliding plate which is opened with a fitted key and which obstructs the wrench entry aperture 68 when the sliding plate is in a closed position.

Preferably, the engagement dome 10 is pivotally interconnected to the second end of the outer arm 4 to permit the engagement dome 10 to be adapted to a variety of wheel assemblies 72 and hubcap configurations. More preferably, the engagement dome 10 has a substantially concave concentric shape which permits a portion of a vehicle hubcap or wheel assembly 72 to extend into the vehicle engagement dome 10. This concentric shape inhibits any damage to the hubcap or wheel exterior surface by only engaging the wheel exterior surface or hubcap at the vehicle engagement dome leading perimeter edge 12. More preferably, the engagement dome leading perimeter edge 12 is covered with a non-metallic material to inhibit scratching the vehicle wheel assembly 72. This material may be comprised of an elastomer, plastic, rubber, felt, cork or other similar non-metallic material known in the art.

The outer arm 4 preferably comprises a means for adjusting the total length of the outer arm 4 to fit different sizes of wheel assemblies 72. Means for adjusting the total length of the outer arm 4 is any device or mechanism which allows adjustment of the total length of the outer arm 4. This length adjustment mechanism may be accomplished by an outer sleeve assembly 34 which slides over an inner sleeve assembly 36. Alternatively, the length adjustment can be achieved by means of an outer arm slot which receives an outer arm pin (not shown). This adjustment device allows the vehicle immobilizer 2 to be adapted for use for a number of different wheel assemblies with different lengths between the exterior tread surface of the tire to the center portion of the wheel.

Figures 4, 5:
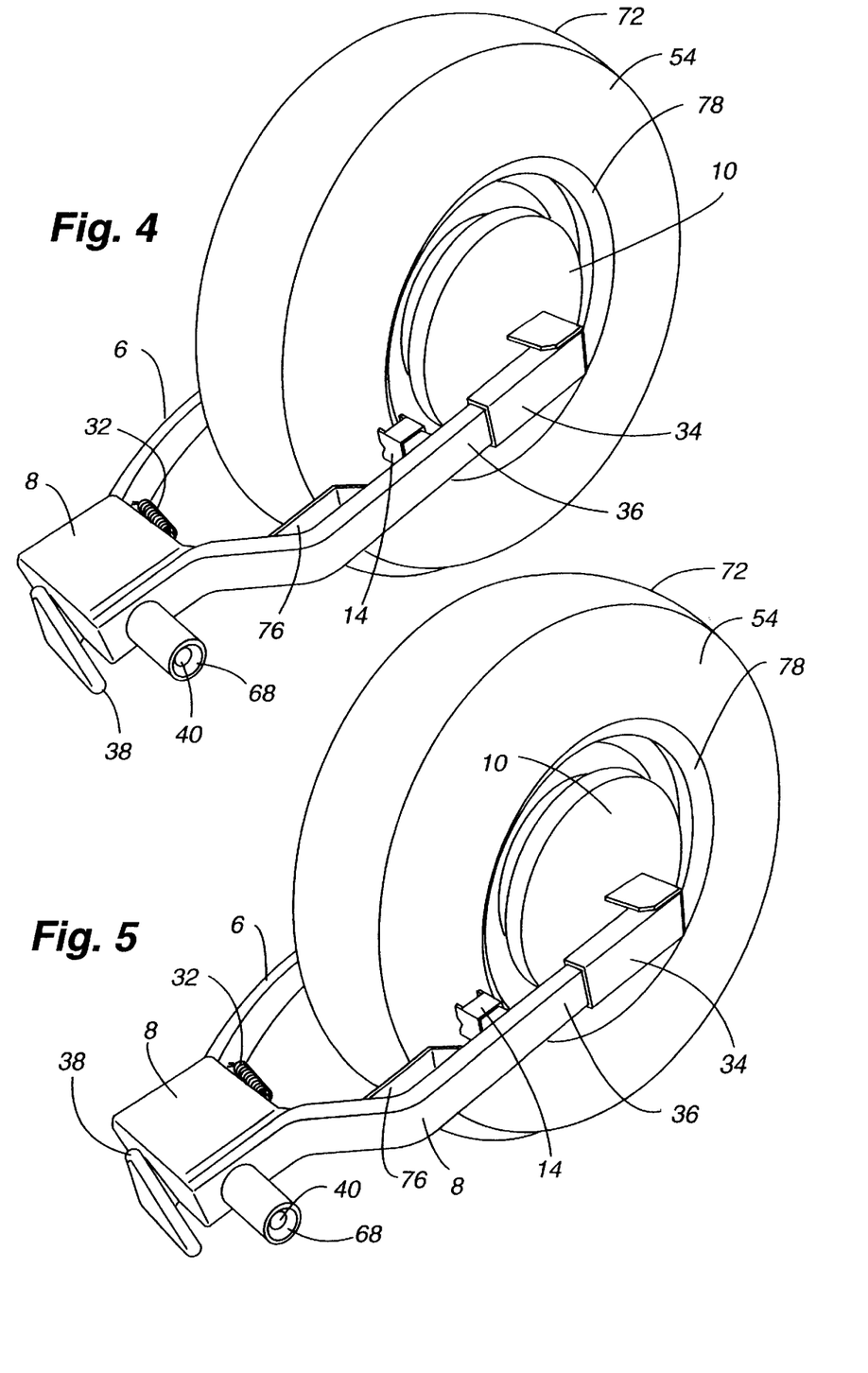
FIG. 4 is a front perspective view of the vehicle immobilizer device illustrated in FIG. 1 installed on a vehicle wheel assembly with the self-positioning tire stop placed partially on the vehicle wheel rim and partially on the vehicle tire.
FIG. 5 is a front perspective view of the vehicle immobilizer device illustrated in FIG. 1 installed on a vehicle wheel assembly with the self-positioning tire stop positioned entirely on the tire.

Referring now to FIGS. 4 and 5, the vehicle immobilizer 2 is shown interconnected to a vehicle wheel assembly 72 to substantially inhibit movement of the vehicle. As illustrated, the outer arm 4 extends substantially parallel to the exterior portion of the vehicle wheel assembly 72 while the inner arm 6 extends around the interior portion of the vehicle wheel assembly 72 near the vehicle axle (not shown). As shown, the self-positioning tire stop 14 can be adjusted on the outer arm to either engage the vehicle tire 54 and rim 78 (FIG. 4) or engage only the vehicle tire 54 (FIG. 5).

A stand 38, which can be selectively rotated and temporarily turned 180 degrees, is preferably interconnected to the base 8. The stand 38 can be interconnected to the base 8 with bolts, screws or other removable means commonly known in the art to allow the stand 38 to be quickly removed, rotated, and reconnected to the base 8. In an alternative embodiment, the stand 38 is on both the upper surface and lower surface of the base 8. The stand 38 can be utilized to allow the vehicle immobilizer 2 to be installed on either the left or right side of the vehicle. Thus, the vehicle immobilizer 2 is versatile for use on either the front, back, left, or right vehicle wheel assemblies 72 or variety of conventional domestic vehicles.

In actual use, a method is provided for attaching the vehicle immobilizer 2 to a vehicle wheel assembly by first positioning an inner arm second end 26 of the vehicle immobilizer 2 on an interior side of the wheel assembly 72. Next, the wheel engagement dome 10 is positioned opposite the exterior side of the wheel assembly, the wheel engagement dome 10 being interconnected to the outer arm second end 18. The self-positioning tire stop 14 is then moved along the outer arm 4 longitudinal axis to a preferred position of use by use of the tire stop adjustment assembly and the self-positioning tire stop 14 is placed in contact with the vehicle tire 54, rim 78 or both.

A force is then applied against the inner arm first end 24, wherein the inner arm first end 24 and the outer arm 4 are driven apart and the wheel engagement dome 10 engages a wheel on hubcap of the vehicle. Simultaneously, the inner arm second end 26 engages an inner surface of the wheel rim while simultaneously engaging a brake assembly or a vehicle tie rod with a stopping member 66 which is interconnected to the inner arm second end 26. Finally, an exterior surface of the tire 54 and/or the rim 78 interconnected to the wheel assembly 72 is engaged with the self-positioning tire stop 14 which is interconnected to the outer arm 4, wherein the vehicle immobilizer 2 is in contact with the wheel assembly at four distinct locations. These contact points include the vehicle immobilizer wheel engagement dome 10, which is engaged at a first point of contact against the vehicle wheel exterior surface. Additionally, the self-positioning tire stop 14, which is preferably interconnected to outer arm inner surface, is in contact with the vehicle tire 54 and/or the rim 78. Additionally, the vehicle immobilizer inner arm second end 26 is frictionally engaged against the vehicle wheel inner surface. Finally, the stopping member 66, which is interconnected proximate to the inner arm second end 26 is engaged against the brake backing plate 56 or vehicle tie rod.

To assist in the installation of the vehicle immobilizer, a spring 32 or other type of biasing means is preferably interconnected on one end to the base 8 and the other end to the inner arm 6. The spring 32 holds the inner arm second end 26 inwardly towards the outer arm 4 until installation, at which time the inner arm second end 26 is pulled outward to permit the vehicle immobilizer to fit around a vehicle wheel assembly 72. The spring 32 is thus beneficial in that it pulls the inner arm second end 26 inwardly to engage the wheel inner surface.

During installation, as the threaded bolt 40 is driven against the inner arm first end 24, the stopping member 66 is driven against the brake backing plate or the tie rod which forces the inner arm second end 26 to drive deeper between the wheel inner surface and the brake backing plate. This prevents the inner arm from being pried loose from the vehicle wheel assembly 72 even if the tire 54 is deflated.

The inner arm second end 26 and stopping member 66 may work in combination with a variety of wheel assemblies for both older and newer vehicles. For example, the stopping member 66 can be pressed against a vehicle brake backing plate. Alternatively, the stopping member 66 can be driven against a disk brake but not pressed against any portion of the brake backing plate. Or the stopping member 66 can be contact with a vehicle tie rod but not engaged to the brake assembly at all.

However, in each of these methods where the stopping member 66 is present, the stopping member 66 is in operable contact with either the brake backing plate, a brake assembly and/or the tie rod, while the inner arm second end 26 is engaged against the vehicle wheel inner surface. This configuration substantially prevents the inner arm 6 from being rotated or pried away from the vehicle wheel assembly 72, especially since the self-positioning tire stop 14 is engaged against the vehicle tire 54 and/or the rim 78, thus driving the wheel engagement dome 10 against the wheel as the vehicle immobilizer 2 is secured to the wheel assembly 72.

While various embodiments of the present invention have been described in detail, it is apparent that further modifications and adaptations of the invention will occur to those skilled in the art. However, it is to be expressly understood that such modifications and adaptations are within the spirit and scope of the present invention.

For purposes of illustration, the following components as identified in FIGS. 1–9 are provided herein for reference:

| Component Number | Component |
| --- | --- |
| 2 | Vehicle immobilizer |
| 4 | Outer arm |
| 6 | Inner arm |
| 8 | Base |
| 10 | Wheel engagement dome |
| 12 | Engagement dome leading perimeter edge |
| 14 | Self-positioning tire stop |
| 16 | Outer arm first end |
| 18 | Outer arm second end |
| 24 | Inner arm first end |
| 26 | Inner arm second end |
| 32 | Spring |
| 34 | Outer sleeve assembly |
| 36 | Inner sleeve assembly |
| 38 | Stand |
| 40 | Threaded bolt |
| 54 | Tire |
| 66 | Stopping member |
| 68 | Wrench entry aperture |
| 78 | Wheel rim |
| 80 | Engagement member |
| 82 | Tire stop stud |
| 84 | Tire stop position adjustment assembly |
| 86 | Outer arm apertures |
| 88 | Leaf spring |
| 90 | Inner arm aperture |
| 92 | Tire stop spring |
| 94 | Tire stop bolt |

What is claimed is:

1. A vehicle immobilizing apparatus adapted for use in combination with a vehicle wheel assembly comprising a wheel, a wheel rim interconnected to said wheel, and a tire interconnected to said wheel rim, comprising:

an outer arm having a first end and a second end;

a self-positioning tire stop interconnected to said outer arm and extending inwardly for frictional engagement to an outer surface of a portion of said wheel assembly, said tire stop comprising biasing means to apply a force on said self-positioning tire stop in a direction toward said wheel assembly;

an engagement dome interconnected to said outer arm second end and operably sized to engage said wheel;

an inner arm having a first end and a second end, said second end operatively shaped to frictionally engage an inner portion of said wheel when said immobilizing apparatus is attached to said wheel assembly;

a base portion interconnected to said first end of said outer arm and pivotally interconnected to said first end of said inner arm, wherein said inner arm can pivot inwardly and outwardly from said outer arm; and a securing means interconnected to said base portion to provide a force to said first end of said inner arm and drive said first end of said inner arm outwardly from said base portion in a direction opposite said outer arm, wherein said self-positioning tire stop engages the outer surface of said wheel assembly, and said second end of said inner arm engages an inner surface of said wheel and said dome engages said wheel.

2. The apparatus of claim 1, further comprising a positioning means for selectively adjusting the position of said self-positioning tire stop along a longitudinal axis of said outer arm.

3. The apparatus of claim 1, wherein said outer arm comprises an adjustment means for modifying the total length of said outer arm.

4. The apparatus of claim 1, wherein said engagement dome is pivotally interconnected to said outer arm second end.

5. The apparatus of claim 1, wherein said engagement dome has a perimeter edge which comprises a non-metallic material to inhibit scratching of said vehicle wheel assembly during use of said vehicle immobilizing apparatus.

6. The apparatus of claim 1, wherein said engagement dome has a recessed interior for receiving a portion of an outwardly extending wheel assembly while a leading perimeter edge of said engagement dome remains engaged to a perimeter of said wheel assembly.

7. The apparatus of claim 1, wherein said self-positioning tire stop comprises an engagement member and a tire stop stud.

8. The apparatus of claim 7, wherein said engagement member is "H" shaped.

9. The apparatus of claim 7, wherein when downward or upward pressure is applied to said outer arm, a corner of said engagement member further engages into the tire, rim or both.

10. The apparatus of claim 2, wherein said positioning means comprises an aperture in said outer arm and a tire stop position adjustment assembly in said self-positioning tire stop.

11. The apparatus of claim 1, further comprising a stopping member interconnected to said inner arm proximate to said second end and extending outwardly from said inner arm to engage a brake assembly of said wheel assembly during use.

12. The apparatus of claim 11, wherein said stopping member is substantially U-shaped to engage a vehicle tie-rod assembly positioned proximate to said wheel assembly.

13. The apparatus of claim 1, wherein said second end of said inner arm has a substantially arcuate cross-sectional shape.

14. The apparatus of claim 1, said securing means comprising a threaded aperture interconnected to said base portion and operably sized to receive a threaded bolt having a first end adapted to fit a tightening tool and a second end in contact with said first end of said inner arm.

15. The apparatus of claim 1, further comprising a support stand interconnected to said base portion, wherein said base portion is prevented from contacting the ground by said support stand and said apparatus may be interchangeably interconnected to either a left side of said vehicle or a right side of said vehicle by rotating said support stand accordingly.

16. The apparatus of claim 1, further comprising a biasing means interconnected on a first end to said base portion and on a second end to said inner arm, wherein said inner arm is biased towards said outer arm.

17. The apparatus of claim 1, wherein said inner arm further comprises an inner arm aperture to receive a secondary locking mechanism.

18. The apparatus of claim 1, wherein said securing means is substantially enclosed by said base portion to inhibit tampering.

19. A method for attaching an apparatus adapted for use in combination with a wheel assembly of a vehicle for temporary immobilization, comprising the steps of:
 a) positioning a second end of an inner arm of said apparatus on an interior side of said wheel assembly;
 b) positioning a self-positioning tire stop on a desired portion of an outer arm of said apparatus, wherein said self-positioning tire stop comprises biasing means to provide a force on said self-positioning tire stop in a direction toward said wheel assembly;
 c) positioning a wheel engagement dome opposite an exterior side of said wheel assembly, said wheel engagement dome interconnected to a second end of said outer arm;
 d) applying a force against a first end of said inner arm, wherein said first end of said inner arm is driven outwardly from a base in a direction opposite said outer arm and said engagement dome engages a wheel or hubcap of said vehicle;
 e) engaging an inner surface of a wheel rim with said second end of said inner arm;
 f) engaging a brake assembly or a vehicle tie rod with a hook stop interconnected proximate to said second end of said inner arm; and
 g) engaging an exterior surface of a tire interconnected to said wheel assembly with said self-positioning tire stop, wherein said apparatus is in contact with said wheel assembly at four distinct locations, thus substantially preventing the unauthorized removal of said apparatus from said wheel assembly.

20. The method of claim 19, wherein the step of applying a force comprises rotating a bolt which is in contact on a first end with said first end of said inner arm.

21. The method of claim 19, further comprising the step of pulling said second end of said inner arm away from said outer arm, wherein said inner arm is biased in a position proximate to said outer arm to facilitate positioning said second end of said inner arm around said wheel assembly.

22. The method of claim 19, further comprising the step of installing a secondary locking mechanism using an inner arm aperture of said apparatus.

23. A vehicle immobilizer device adapted for removable interconnection to a vehicle wheel assembly, comprising:
 a) an outer arm having a first end and a second end, said second end pivotally interconnected to a substantially circular dome assembly for engagement to a vehicle wheel, said outer arm further comprising adjustment means for modifying the total length of said outer arm;
 b) a self-positioning tire stop interconnected to said outer arm and extending inwardly toward said vehicle wheel assembly, wherein said self-positioning tire stop comprises biasing means to provide a force on said self-positioning tire stop in a direction toward said wheel assembly;
 c) positioning means interconnected to said outer arm to provide selection adjustable positioning of said self-positioning tire stop along a longitudinal axis of said outer arm;
 d) an inner arm having a first end and a second end, said second end having a geometric configuration adapted for positioning adjacent an inner wheel rim of said wheel assembly to engage an inner surface of said wheel rim;
 e) a base portion rigidly interconnected to said first end of said outer arm and pivotally interconnected to said first end of said inner arm; and
 f) a securing means interconnected to said base portion for providing a force to said first end of said inner arm to drive said first end of said inner arm in a direction substantially opposite said outer arm, wherein when said vehicle immobilizer is adapted for installation to said vehicle wheel assembly there is contact with said vehicle wheel assembly at least at said engagement dome, said self-positioning tire stop and said inner arm.

* * * * *

UNITED STATES PATENT AND TRADEMARK OFFICE
CERTIFICATE OF CORRECTION

PATENT NO. : 6,032,497
DATED      : March 7, 2000
INVENTOR(S) : Robert A. Fulcher It is certified that error appears in the above-identified patent and that said Letters Patent is hereby corrected as shown below:

Title page, item [54] and col. 1, should read as follows:
"VEHICLE IMMOBILIZER WITH SELF-POSITIONING TIRE STOP".

Signed and Sealed this

Twenty-sixth Day of December, 2000

Attest:

Q. TODD DICKINSON

Attesting Officer     Director of Patents and Trademarks